United States Patent
Cline et al.

(10) Patent No.: US 6,508,613 B2
(45) Date of Patent: Jan. 21, 2003

(54) DRILL GUIDE AND METHOD FOR DRILLING HOLES

(75) Inventors: Larry Dean Cline, Fairfield, OH (US); Dan Lee Neal, Middletown, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/852,201

(22) Filed: May 9, 2001

(65) Prior Publication Data

US 2002/0168237 A1 Nov. 14, 2002

(51) Int. Cl.[7] .......................... B23B 35/00; B23B 47/28
(52) U.S. Cl. .................... 408/1 R; 408/103; 408/115 R
(58) Field of Search ......................... 408/1 R, 97, 103, 408/115 R, 115 B, 3

(56) References Cited

U.S. PATENT DOCUMENTS

| | | | | |
|---|---|---|---|---|
| 2,353,757 A | * | 7/1944 | Priest, Jr. ................. | 408/115 R |
| 3,761,193 A | * | 9/1973 | Del Giudice .............. | 269/87.3 |
| 4,705,436 A | | 11/1987 | Robertson ................. | 408/72 R |
| 4,712,950 A | | 12/1987 | Reynolds .................. | 408/72 R |
| 5,094,491 A | | 3/1992 | Berghammer .............. | 285/92 |
| 5,214,832 A | | 6/1993 | Koehler .................... | 29/268 |
| 5,362,111 A | | 11/1994 | Harbin ...................... | 285/92 |
| 5,409,327 A | | 4/1995 | Schroeder .................. | 408/1 R |

FOREIGN PATENT DOCUMENTS

| | | | | |
|---|---|---|---|---|
| GB | 11705 | * | of 1912 | ............. 408/115 R |
| GB | 748359 | * | 5/1956 | ............. 408/115 R |
| GB | 882805 | * | 11/1961 | ............. 408/115 R |
| SU | 429897 | * | 10/1974 | ............. 408/115 R |
| SU | 686833 | * | 10/1979 | ............. 408/115 R |
| SU | 1093430 | * | 5/1984 | ............. 408/115 R |
| SU | 1115864 | * | 9/1984 | ............. 408/115 R |
| SU | 1252072 | * | 8/1986 | ............. 408/241 B |
| SU | 1388198 | * | 4/1988 | ............. 408/115 R |
| SU | 1553278 | * | 3/1990 | ............. 408/115 R |
| SU | 1731459 | * | 5/1992 | ............. 408/115 B |

* cited by examiner

Primary Examiner—Daniel W. Howell
(74) Attorney, Agent, or Firm—Rodney M. Young; Hasse Guttag & Nesbitt LLC; Eric W. Guttag

(57) ABSTRACT

A drill guide that is capable of guiding the drilling holes, in particular lockwire holes, transversely through one corner of a nut at an oblique angle to a face thereof and a method for using same. The drill guide comprises at least one guide component having a first and a second side transverse to the first side. The first side has a recess with first and second surfaces for receiving the corner of the nut, the first surface being closer to the second side. Also included is a drill bit guide for guiding a drill bit of a drill that is accessible from the second side and extends towards the first surface of the recess along a longitudinal axis in the direction of the second surface of the recess so that the drill bit is capable of drilling a hole transversely through the corner of the nut at an oblique angle to the face of the nut that the drill bit initially engages.

26 Claims, 3 Drawing Sheets

DRILL GUIDE AND METHOD FOR DRILLING HOLES

BACKGROUND OF THE INVENTION

The present invention relates generally to a drill guide for drilling a hole at an oblique angle through two adjacent surfaces of a nut having a threaded interior. The present invention further relates to method for drilling holes, especially lockwire holes, using the drill guide where the nut to be drilled is already fastened to the workpiece or otherwise is inaccessible to conventional machine tools, such as a drill press.

Lockwires have often been used with threaded fasteners to prevent their inadvertent rotation and unthreading. These threaded fasteners are typically in the form of or have a hexagonally shaped nut (hereinafter referred to interchangeably as "hexagonal nuts" or "hex nuts"). One example of such nuts is a coupling nut commonly referred to as a B-nut. The B-nut is used to provide a leak proof connection for a fluid-conducting tube and a projecting nozzle (of the fitting) that the tube end is pressed over. The B-nut is usually threaded down over the tube end and onto the fitting past the nozzle to provide a seal. The lockwire fixes the B-nut relative to the fitting so that the B-nut does not rotate and unthread due to external forces, such as vibration. The fitting or mate to the B-nut can also be lockwired.

Typically, the lockwire is passed through a transverse hole in at least two threaded fasteners and is twisted back on itself in alternating clockwise and counterclockwise directions between the threaded fasteners. The process is then duplicated between additional threaded fasteners until the entire threaded fastener pattern has been safety wired. Following the required stringing and twisting, the wire is cut and bent into a certain position. (In the case of the B-nut, the lockwire is typically passed through holes formed in the B-nut and secured to a boss on the base or to the mating fitting.)

For hexagonal nuts, the hole (or holes) for the lockwire is typically formed by drilling through one or more of the outer nut lobes or corners. In the past, the drilling of a lock wire hole in such nuts has been an awkward and time-consuming task. The lockwire hole in the nut lobe or corner is typically drilled at a 30° angle relative to the face of the nut (i.e., is an oblique angle). This sharp oblique angle often results in drilling problems because the angle of the nut face tends to divert the line of action of the drill, often resulting in broken drills, a damaged drill part or an imperfect hole through the nut lobe or corner. These and other difficulties have led others to seek alternatives to the use of lockwires for such nuts. See, for example, U.S. Pat. No. 5,362,111 (Harbin), issued Nov. 8, 1994 (spring clip used to prevent rotation of coupling nuts); U.S. Pat. No. 5,094,491 (Berghammer et al), issued Mar. 10, 1992 (integral locking mechanism used to prevent rotation of coupling nuts).

U.S. Pat. No. 5,409,327 (Schroeder), issued Apr. 25, 1995, discloses an apparatus for drilling lockwire holes in lockwire nuts. This apparatus includes a variable speed drill press mounted on a work bench that has a vertically movable drill quill supporting a rotating drill spindle on one end of which is mounted a drill chuck for holding and driving a drill bit for drilling a hole in the lockwire nuts. An N/C microprocessor is also coupled to the drill press for controlling the vertical motion of the drill quill. The nut holder of this apparatus includes a collet chuck having three jaw inserts, each of the jaw inserts having a drill guide that guides the drill bit at the appropriate angle against the faces of the nut to drill lockwire holes through the nut.

The apparatus of the Schroeder patent is undoubtedly useful for precise drilling of lockwire holes in hexagonal nuts in a machine shop or when the nuts are not currently fastened to the workpiece. However, in some instances, lockwire holes may not have been drilled in the hexagonal nut before it is fastened to the workpiece or need to be drilled in the nut at a location remote from the machine shop. In particular, if lockwire holes need to be formed in nuts fastened to the workpiece, it may not be possible (or desirable) to unfasten the nut to drill the needed lockwire hole(s). Unfortunately, the apparatus of the Schroeder patent probably cannot be easily used to form lockwire holes in hexagonally shaped nuts that are already fastened to the workpiece.

Accordingly, it would be desirable to provide a device that will allow the precise and relatively easy drilling of lockwire holes in hexagonal nuts and other nuts requiring lockwire holes. In particular, it would be desirable to be able to easily and precisely drill such lockwire holes while the nut(s) still fastened to the workpiece or when the lockwire holes need to be formed in the nut at a location remote from a machine shop.

SUMMARY OF THE INVENTION

The present invention relates to a drill guide that is capable of guiding the drilling of holes, in particular lockwire holes, transversely through one lobe or corner of a nut at an oblique angle to a face of the nut. The drill guide comprises at least one guide component having:

(a) a first side and a second side transverse to the first side;

(b) the first side having a recess with first and second surfaces for receiving the corner of the nut, the first surface being closer to the second side;

(c) a drill bit guide for guiding a drill bit of a drill, the drill bit guide being accessible from the second side and extending towards the first surface of the recess along a longitudinal axis in the direction of the second surface of the recess so that the drill bit is capable of drilling a hole transversely through the corner of the nut at an oblique angle relative to the face of the nut that the drill bit initially engages.

The present invention further relates to a method for drilling holes in such a nut that is already fastened to the workpiece. This method comprises the steps of:

(a) providing the drill guide comprising the at least one guide component;

(b) positioning the at least one guide component of the drill guide so that the one corner of the nut is securely received by the recess;

(c) inserting the drill bit of the drill into the drill bit guide so that the drill bit engages a face of the nut closest to the first surface of the recess;

(d) drilling a hole transversely through the corner of the nut at an oblique angle relative to the face of the nut that the drill bit initially engages.

The drill guide and method of the present invention allows holes, in particular lockwire holes, to be easily and precisely drilled transversely through a corner of the nut, even though the angle being drilled is oblique relative to the face of the nut that the drill initially engages. Moreover, the drill guide of the present invention allows such holes to be easily and precisely drilled transversely through the corner of the nut, even when the nut is already fastened to the workpiece and is not easy (or desirable) to unfasten the nut. An alternative embodiment of the drill guide of the present invention also allows the guide component to be disassembled in the event the drill bit is broken so that the broken bit can be easily removed from the guide component. Another alternative embodiment of present invention also allows for replacement of drill bit guide that typically contains a bore for guiding the drill bit in the event the bore becomes damaged, clogged or to permit easier removal of a broken drill bit. Yet another alternative embodiment of the present invention comprises two such guide components that can be releasably joined together to allow easy and precise drilling of such holes at opposite corners or lobes the nut, in particular, a hexagonal nut.

DETAILED DESCRIPTION OF THE INVENTION

Figure 1:
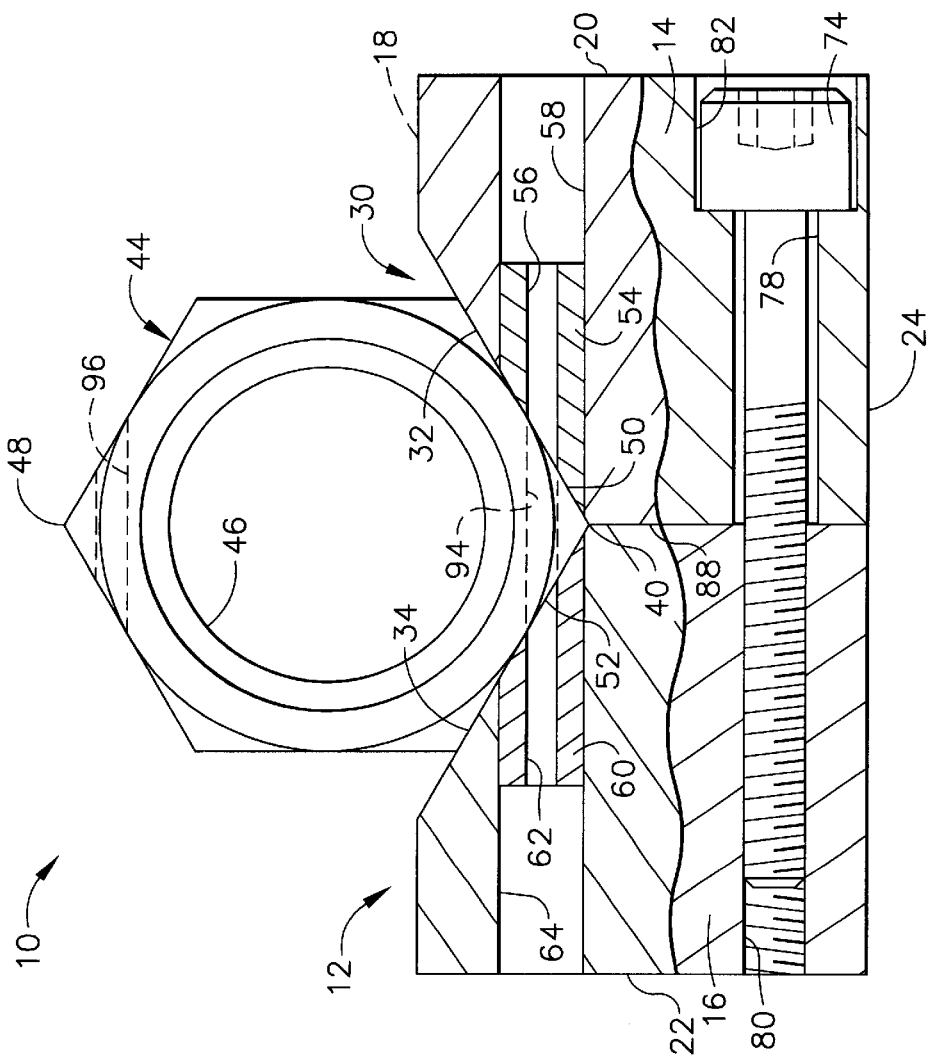
FIG. 1 shows an embodiment of one guide component of the drill guide of the present invention in conjunction with a nut to be drilled.

Referring to the drawings, FIG. 1 shows the drill guide of the present invention generally indicated as 10. Drill guide 10 comprises at least one guide component in the form of a guide block generally indicated as 12. Guide block 12 is shown in FIG. 1 as comprising two sections, the right one generally indicated as 14, the left one generally indicated as 16 that can be releasably joined together (as described hereinafter) to form unitary structure. Block 12 includes a first or front nut face-receiving side indicated as 18, a second or right side 20 intersecting side 18 transversely (e.g., perpendicularly) at a corner of block 12, a third or left side 22 spaced from and generally parallel to side 20 and intersecting side 18 transversely (e.g., perpendicularly) at a corner of block 12, and a fourth or back side 24 spaced from side 18 and intersecting sides 20 and 22 transversely (e.g., perpendicularly) at respective corners of block 12. Guide component 12 also has a bottom side 26 and a top side 28 spaced from side 26. Sides 26 and 28 are shown intersecting sides 18, 20, 22 and 24 transversely (e.g., perpendicularly) at the respective corners of block 12.

As shown in FIG. 1, side 18 has formed therein a nut-receiving recess or groove 30 that is generally V-shaped proximate the middle or center thereof. Recess 30 comprises a first slanted generally planar surface 32 and a second slanted generally planar surface 34. As shown in FIG. 1, section 14 of block 12 includes surface 32 while section 16 of guide component 12 includes surface 34, with surfaces 32 and 34 intersecting at the edge where sections 14 and 16 are joined together to form recess 30. As also shown in FIG. 1, recess 30 receives one corner or lobe 40 of a hexagonal nut to be drilled indicated generally as 44 that has an threaded interior bore indicated generally as 46 and a lobe or corner 48 that is opposite from corner 40. Corner 40 has adjacent faces indicated as 50 and 52, with face 50 abutting surface 32 and face 52 abutting surface 34.

Figure 2:
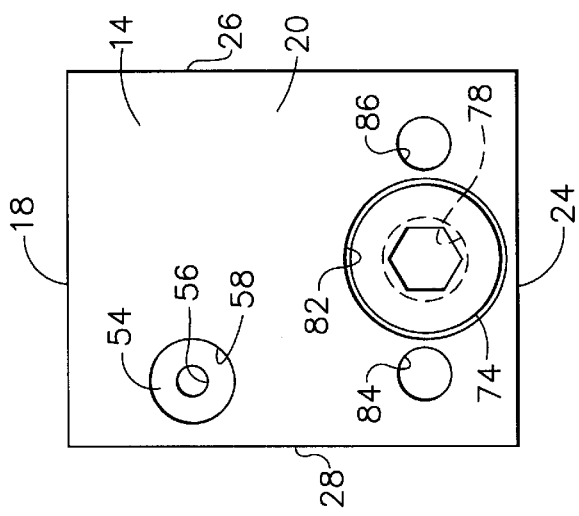
FIG. 2 is a side view of the guide component of FIG. 1.

As shown in FIG. 1 and especially FIG. 2, section 14 of block 12 has a drill bit guide indicated generally as 54. Drill bit guide 54 has a generally cylindrical bore 56 that extends therethrough along a longitudinal axis to surface 32 and in the direction of surface 34, i.e., bore 56 exits at the end of drill bit guide 54 proximate surface 32 and opposite surface 34. Drill bit guide 54 and bore 56 are accessible from side 20 via generally cylindrical bore 58 that extends through section 14 from side 20 to surface 32.

As shown in FIG. 1, section 16 of guide component 12 also has a drill bit guide generally indicated as 60. Drill bit guide 60 has a generally cylindrical bore 62 that extends therethrough along a longitudinal axis to surface 34 and in the direction of surface 32, i.e., bore 62 exits at the end of drill bit guide 60 proximate surface 34 and opposite surface 32. Drill bit guide 60 and bore 62 are accessible from side 24 via generally cylindrical bore 64 that extends through section 16 from side 24 to surface 34.

As also shown in FIG. 1, the longitudinal axes of bores 56 and 62 (as well as drill bit guides 54 and 60) are generally aligned, i.e., bores 56 and 62 extend generally along the same longitudinal axis. This facilitates the ability to drill holes completely across the corner 40 (or 48) of nut 44 starting from either drill bit guide 54 or drill bit guide 60. The ability to drill across corner 40 (or 48) of nut 44 via either drill bit guide 54 or 60 has the additional benefit of dealing with potential work hardening that can occur during drilling of the hole that might otherwise make it difficult or impossible to complete the drilling of the hole. For example, if the drill bit was initially inserted into bore 56 of drill bit guide 54 and drilling across the corner of nut 44 cannot be completed due to work hardening, drilling could be potentially completed by inserting the drill bit into bore 62 of drill bit guide 60.

As also shown in FIG. 2, bore 56 (and 62) is closer to top side 28 and side 22 of block 12 to aid in locating guide block 12 axially with respect to nut 44 so that the hole can be appropriately drilled across corner 40 (or 48) of nut 44. If desired, drill guide 10 can be provided with a locator component such as a pin or machined stop so that guide block 12 is a axially located with respect to nut 44 for appropriate drilling across corner 40 (or 48) of nut 44.

Drill bit guides 54 and 60 are shown in FIG. 1 as being in the form of removable bushings or inserts that are typically pressure fitted or inserted into respective bores 58 and 64 in sections 14 and 16 for ease of removal. For example, if bores 56 or 62 are damaged, become clogged by debris or a broken drill bit becomes stuck in one or both bores, drill bit guide inserts 54 and 60 can be removed (e.g. such as by pressing or driving out) and then replaced by new drill bit guide inserts. Also, while drill bit guide inserts 54 and 60 are shown in FIG. 1 as having a length shorter than respective bores 58 and 64, these inserts could having desired length, for example a length such that the inserts extend from one end of the bore to the other end.

As shown in FIGS. 1 and 2, sections 14 and 16 are joined together by a bolt indicated generally as 74 that can be threaded at the end thereof. Bolt 74 can be inserted through bore 78 in section 14 and bore 80 in section 16, with bore 80 having appropriate threading for receiving the threaded end of bolt 74. Bore 78 can also have a counterbore indicated as 82 for receiving the head of bolt 74. As shown in FIG. 2, section 14 (as well as section 16) has a pair of bores 84 and 86, one on each side of bore 78. Bores 84 and 86 receive dowels or similar guide members (not shown) so that sections 14 and 16 can be joined together at common edge 88 in the same locked configuration each time.

Figure 3:
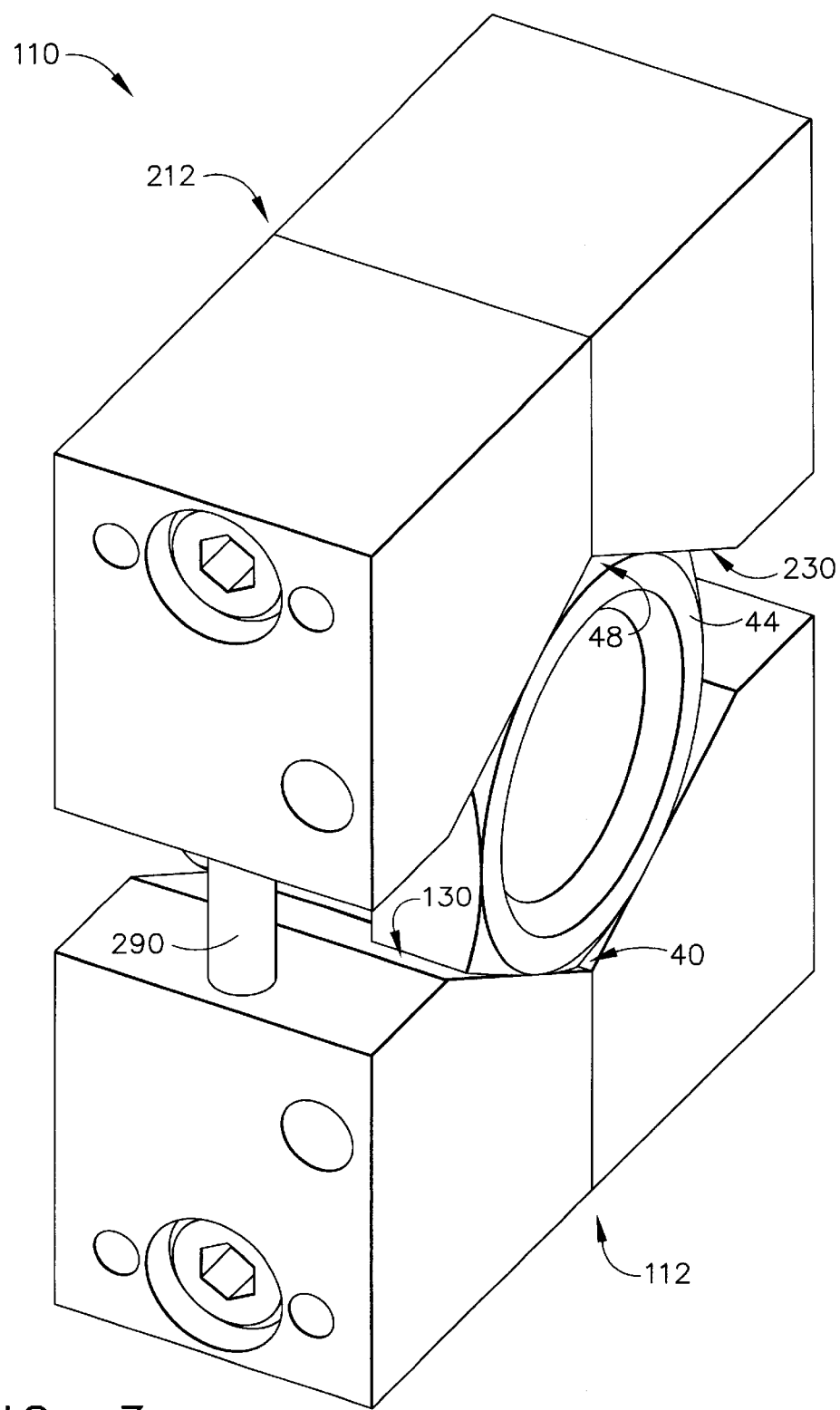
FIG. 3 is perspective view an alternative embodiment of the drill guide of tile present invention comprising two guide components joined together to secure the nut the be drilled.
Figure 4:
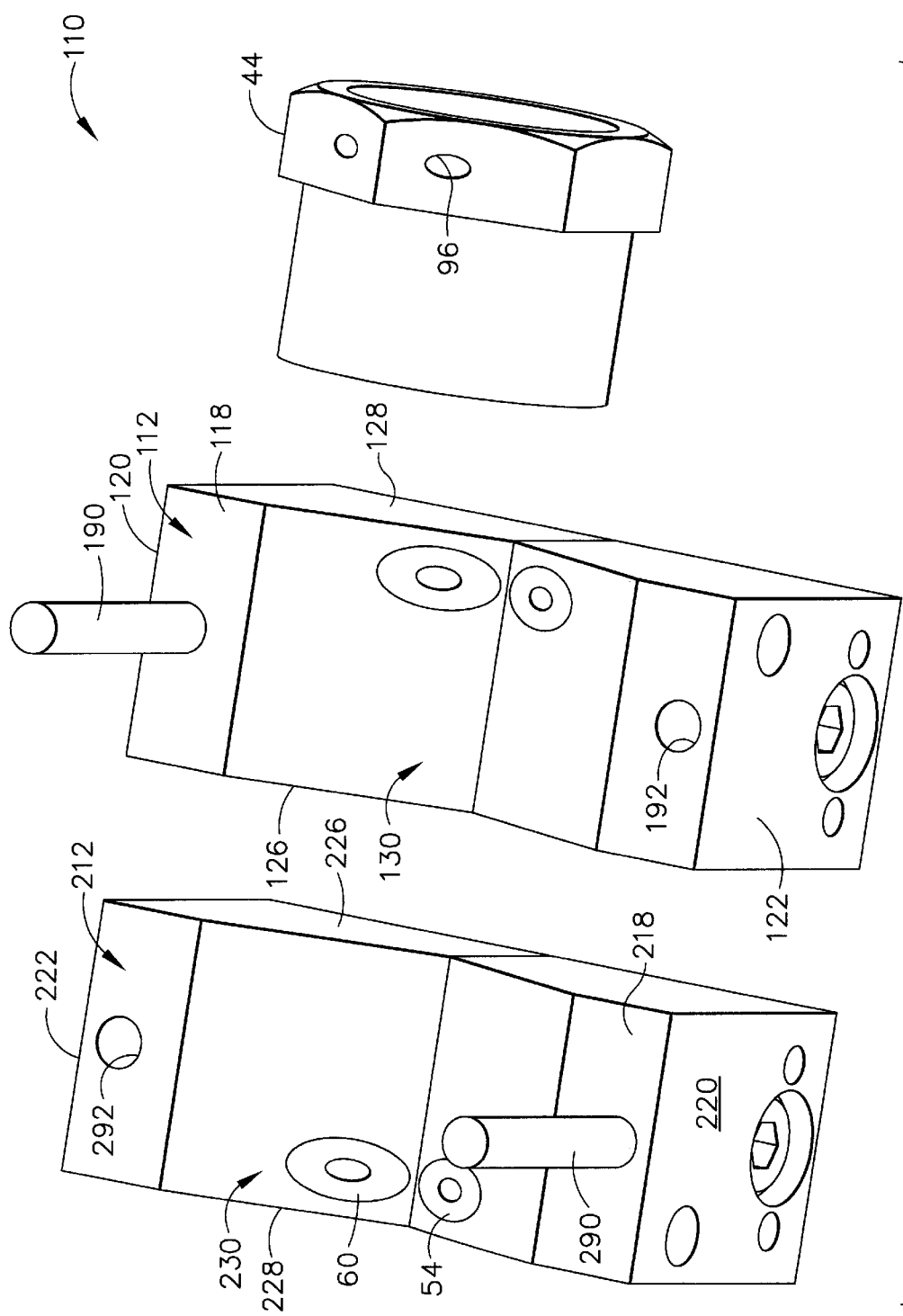
FIG. 4 is a perspective view of the alternative embodiment of FIG. 3 with the guide components in an unjoined configuration.

In use, guide block 12 can be releasably secured to nut 44 by a clamp or other suitable device so that recess 30 can securely receive corner 44 of nut 40. For example, a block similarly configured to guide block 12 can be positioned to receive the opposite corner 48 of nut 44 and can be appropriately joined to block 12 by a clamp or other suitable device so that recess 30 can securely receive corner 40 of nut 44. Indeed, and as shown in FIG. 3, an alternative embodiment of the drill guide 10 of the present invention indicated generally as assembly 110 can comprise a pair of guide components in the form of guide blocks 112 and 212 that are of the same or similar construction and configuration as guide block 12 shown in FIG. 1. As shown in FIG. 3, recess 130 of guide block 112 receives corner 40 of nut 44, while recess 230 of guide block 212 receives corner 48 of nut 44 that is opposite from corner 40. As shown in FIG. 3 and especially FIG. 4, guide blocks 112 and 212 are held together in a secure and locking configuration around nut 44 by a pair of generally cylindrical dowels or similar elongated locking members 190 and 290, each dowel 190 and 290 being positioned opposite one face of nut 44 when guide blocks 112 and 212 are joined together. As shown in FIG. 4, one end of dowel 190 is secured or attached to side 118 near side 120, and between bottom and top sides 126 and 128, while one end of dowel 290 is secured or attached to side 218 near side 220, and between bottom and top sides 226 and 228. FIG. 4 also shows a bore 192 in side 118 near side 122 for receiving and securing the other end of dowel 290, as well as a bore 292 in side 218 near side 222 for receiving and securing the other end of dowel 190. Dowels 190 and 290 and bores 192 and 292 can be constructed or configured to releasably interlock so that blocks 112 and 212 remain securely against respective lobes 40 and 48 of nut 44. Alternatively, blocks 112 and 212 can be releasably secured in the configuration shown in FIG. 3 by clamps or other similar devices.

In the method of the present invention, and as shown particularly in FIG. 3, drill guide assembly 110 is releasably secured to nut 44 by positioning block 112 on one side of nut 44 to receive corner 40 and by positioning block 212 on the opposite side of nut 44 to receive corner 48. Blocks 112 and 212 are then joined together by fitting the ends of dowels 190 and 290 in respective bores 192 and 292 and then sliding blocks 112 and 212 towards each other so that recess 130 receives and engages corner 40 and recess 230 receives and engages corner 48. Blocks 112 and 212 are then secured in this configuration by clamps or other suitable means. As shown in FIG. 1, a hole, such as a lockwire hole indicated as 94, can be drilled transversely through corner 40 from face 50 to face 52 (by inserting the drill bit into bore 56 of drill guide bit 54) or from 52 to face 50 (by inserting the drill bit into bore 62 of drill guide bit 60). The angle of bore 56 (or 62) when it terminates at surface 32 (or 34) relative to face 50 (or 52) is typically an oblique angle of about 30° for hexagonal nuts 44. As also shown in FIG. 1, holes can be drilled transversely through more than corner of nut, for example, the lockwire hole 96 through corner 48. This can be achieved either by using a single guide block 12, or more typically by using a pair of guide blocks 112 and 212 that are joined together, as shown in FIG. 3.

While the FIGs. show the use of drill guide 10 (and drill guide assembly 110) with reference to a hexagonal nut 44 (i.e., a nut having six faces), the drill guide of the present invention can also be modified or configured so that it is useful with other nuts that have one circular or oval surface (i.e., only one face) or that have a plurality of faces, typically at least three faces, including triangular nuts (i.e., those having three faces), square nuts (i.e., those having four faces), octagonal nuts (i.e., those having eight faces), and dodecagonal nuts (i.e., those having twelve faces). Because the angle formed by the corners of these other nuts is different, the angle formed by surfaces 32 and 34 of recess 30 typically needs to adjusted or configured accordingly. Guide 10 can also be secured to nut 44 before it is fastened to the desired workpiece (as shown in FIG. 3) or alternatively can be secured to nut 44 while it is already fastened to the desired workpiece. In addition, while nut 44 is shown as having a threaded interior bore 46, it can also have a relatively smooth or unthreaded interior bore or can be completely solid, i.e., no interior bore. The faces of these nuts are typically planar but can include one or more faces that are non-planar (e.g., curved) with the configuration of recess 30 being adjusted accordingly.

While specific embodiments of the method of the present invention have been described, it will be apparent to those skilled in the art that various modifications thereto can be made without departing from the spirit and scope of the present invention as defined in the appended claims.

What is claimed is:

1. A drill guide that is capable of guiding the drilling of a hole transversely through a corner of a nut at an oblique angle to a face of the nut, the drill guide comprising at least one guide component having:
    (a) a first side and a second side transverse to the first side;
    (b) the first side having a recess with intersecting first and second surfaces for receiving the corner of the nut, the first surface being closer to the second side;
    (c) a drill bit guide for guiding a drill bit of a drill, the drill bit guide having a bore accessible from the second side and extending towards the first surface of the recess along a longitudinal axis in the direction of the second surface of the recess so that the drill bit is capable of drilling a hole transversely through the corner of the nut at an oblique angle relative to the face of the nut that the drill bit initially engages.

2. The guide of claim 1 wherein the guide component has a third side transverse to the first side and spaced from the second side and a second drill bit guide, the second drill bit guide being accessible from the third side and extending towards the second surface of the recess along a longitudinal axis in the direction of the first surface of the recess, and wherein the longitudinal axes of the first drill bit guide and the second drill bit guides are aligned.

3. The guide of claim 2 wherein the guide component comprises a first section and a second section, the first section including the first surface of the recess, the second section including the second surface of the recess, and wherein the first and second sections are releasably joined together at an edge where the first and second surfaces of the recess intersect.

4. The guide of claim 3 wherein the first drill bit guide has a generally cylindrical bore extending therethrough that exits proximate the first surface of the recess and wherein the second drill bit guide has a generally cylindrical bore extending therethrough that exits proximate the second surface of the recess, the first and second drill bit guide bores having longitudinal axes that are aligned.

5. The guide of claim 2 wherein the recess is generally V-shaped and wherein the first and second surfaces of the recess are generally planar.

6. The guide of claim 5 wherein the recess is configured to receive one corner of a hexagonal nut.

7. The guide of claim 6 wherein the drill bit guide extends to the first surface of the recess at an angle of about 30° relative to the face of the nut abutting the first surface.

8. A drill guide that is capable of guiding the drilling of a hole transversely at an oblique angle through adjacent faces at one corner of a nut having an interior bore, the drill guide comprising at least one guide component having:
- (a) a first side and a second side transverse to the first side;
- (b) the first side having a generally V-shaped recess with generally planar intersecting first and second surfaces for receiving the adjacent faces at the corner of the nut, the first surface being closer to the second side;
- (c) a drill bit guide having a generally cylindrical bore for guiding a drill bit of a drill the drill bit guide bore being accessible from the second side and extending to the first surface of the recess along a longitudinal axis in direction of the second surface of the recess so that the drill bit is capable of drilling a hole through the corner of the nut from one adjacent face to the other adjacent face without intersecting the interior bore of the nut.

9. The guide of claim 8 wherein the guide component has a third side transverse to the first side and spaced from the second side and a second drill bit guide, the second drill bit guide having a generally cylindrical bore accessible from the third side and extending to the second surface of the recess along a longitudinal axis in the direction of the first surface of the recess, and wherein the longitudinal axes of the first and second drill bit guides bores of are aligned.

10. The guide of claim 9 wherein the guide component comprises a first section and a second section, the first section including the first surface of the recess, the second section including the second surface of the recess, and wherein the first and second sections are releasably joined together at an edge where the first and second surfaces of the recess intersect.

11. The guide of claim 10 wherein the recess is configured to receive one corner of a hexagonal nut and wherein the first drill bit guide bore exits at the first surface of the recess at an angle of about 30° relative to the adjacent face of the nut abutting the first surface of the recess and wherein the second drill bit guide bore exits at the second surface of the recess at an angle of about 30° relative to the adjacent face of the nut abutting the second surface of the recess.

12. A drill guide assembly that is capable of guiding the drilling of a hole transversely at an oblique angle through adjacent faces at each opposite corner of a hexagonal nut having six faces and an interior bore, the assembly comprising at a pair guide components releasably joined together so that each guide component is capable of securely receiving one of the respective opposite corners, each guide component comprising:
- (a) a first side and a second side transverse to first side;
- (b) the first side having a generally V-shaped recess with generally planar intersecting first and second surfaces for receiving the adjacent faces at one corner of the nut, the first surface being closer to the second side;
- (c) a drill bit guide having a generally cylindrical bore for guiding a drill bit of a drill, the drill bit guide bore being accessible from the second side and extending to the first surface of the recess along a longitudinal axis in the direction of the first surface of the recess so that the drill bit is capable of drilling a hole through the corner of the nut from one adjacent face to the other adjacent face without intersecting the interior bore of the nut.

13. The assembly of claim 12 wherein each guide component has a third side transverse to the first side and spaced from the second side and a second drill bit guide, the second drill bit guide having a generally cylindrical bore accessible from the third side and extending to the second surface of the recess along a longitudinal axis in the direction of the second surface of the recess, and wherein the longitudinal axes of the first and second drill bit guide bores are aligned.

14. The assembly of claim 13 wherein each guide component comprises a first section and a second section, the first section including the first surface of the recess, the second section including the second surface of the recess, and wherein the first and second sections are releasably joined together at an edge where the first and second surfaces of the recess intersect.

15. The assembly of claim 13 wherein the first drill bit guide bore exits at the first surface of the recess at an angle of about 30° relative to the adjacent face of the nut abutting the first surface of the recess and wherein the second drill bit guide bore exits at the second surface of the recess at an angle of about 30° relative to the adjacent face of the nut abutting the second surface of the recess.

16. The assembly of claim 13 which comprises a pair elongated locking members, each locking member being positioned opposite one face of the nut when the guide components are joined together, one end each locking member being securable to the first side of one of the guide components, the other end of each locking member being securable to the first side of the other guide component.

17. The assembly of claim 16 wherein each locking member is a generally cylindrical dowel.

18. A method for drilling a hole transversely through a corner of a nut at an oblique angle to a face of the nut, the method comprising the steps of:
- (a) providing a drill guide comprising at least one guide component having:
    - (1) a first side and a second side transverse to the first side;
    - (2) the first side having a recess with intersecting first and second surfaces for receiving the corner of the nut, the first surface being closer to the second side;
    - (3) a drill bit guide for guiding a drill bit of a drill, the drill bit guide having a bore accessible from the second side and extending towards the first surface of the recess along a longitudinal axis in the direction of the second surface of the recess so that the drill bit is capable of drilling a hole transversely through the corner of the nut at an oblique angle relative to the face of the nut that the drill bit initially engages;
- (b) positioning the at least one guide component of the drill guide so that the corner of the nut is securely received by the first and second surfaces of the recess;
- (c) inserting the drill bit of the drill into the drill bit guide so that the drill bit engages a face of the nut closest to the first surface of the recess;
- (d) drilling a hole transversely through the corner of nut at an oblique angle relative to the face of the nut that the drill bit initially engages.

19. The method of claim 18 wherein step (a) comprises providing a drill guide wherein the guide component has a third side transverse to the first side and spaced from the second side and a second drill bit guide, the second drill bit guide being accessible from the third side and extending towards the second surface of the recess along a longitudinal axis in the direction of the second surface of the recess, and wherein the longitudinal axes of the first drill bit guide and the second drill bit guides are aligned.

20. The method of claim 19 wherein step (a) comprises providing a drill guide wherein the first drill bit guide has a generally cylindrical first bore extending therethrough that exits proximate the first surface of the recess and wherein the second drill bit guide has a generally cylindrical second bore extending therethrough that exits proximate the second surface of the recess, the first and second drill bit guide bores having longitudinal axes that are aligned.

21. The method of claim 20 wherein step (a) comprises providing a drill guide wherein the recess is generally V-shaped and wherein the first and second surfaces of the recess are generally planar.

22. The method of claim 21 which comprises drilling a hole tranversely through the corner of a hexagonal nut and wherein step (a) comprises providing a drill guide wherein the recess is configured to receive one corner of the hexagonal nut.

23. The method of claim 22 wherein step (a) comprises providing a drill guide wherein the first drill bit guide bore exits at the first surface of the recess at an angle of about 30° relative to the adjacent face of the hexagonal nut abutting the first surface of the recess and wherein the second drill bit guide bore exits at the second surface of the recess at an angle of about 30° relative to the adjacent face of the hexagonal nut abutting the second surface of the recess.

24. A method for drilling a hole transversely at an oblique angle through adjacent faces at one corner of a nut having at least three faces and an interior bore, the method comprising the steps of:

(a) providing a drill guide comprising at least one guide component having:
 (1) a first side and a second side transverse to the first side;
 (2) the first side having a generally V-shaped recess with generally planar intersecting first and second surfaces for receiving the adjacent faces at the corner of the nut, the first surface being closer to the second side;
 (3) a drill bit guide for guiding cylindrical bore for guiding a drill bit of a drill, the drill bit guide bore being accessible from the second side and extending to the first surface of the recess along a longitudinal axis in direction of the second surface of the recess so that the drill bit is capable of drilling a hole through the corner of the nut from one adjacent face to the other adjacent face without intersecting the interior bore of the nut;

(b) positioning the at least one guide component of the drill guide so that the adjacent faces at the corner of the nut are securely received by the first and second surfaces of the recess;

(c) inserting the drill bit of the drill into the drill bit guide bore so that the drill bit engages the adjacent face of the nut closest to the first surface of the recess;

(d) drilling a hole transversely through the corner of nut from the adjacent face abutting to the first surface of the recess to the adjacent face abutting to the second surface of the recess without intersecting the interior bore of the nut and at an oblique angle relative to the adjacent face abutting the first surface of the recess.

25. The method of claim 24 wherein step (a) comprises providing a drill guide wherein the guide component has a third side transverse to the first side and spaced from the second side and a second drill bit guide, the second drill bit guide having a generally cylindrical bore accessible from the third side and extending to the second surface of the recess along a longitudinal axis in the direction of the first surface of the recess, and wherein the longitudinal axes of the first and second drill bit guide bores are aligned.

26. The method of claim 25 which comprises drilling a hole tranversely through the corner of a hexagonal nut and wherein step (a) comprises providing a drill guide wherein the recess is configured to receive one corner of the hexagonal nut and wherein the first drill bit guide bore exits at the first surface of the recess at an angle of about 30° relative to the adjacent face of the nut abutting the first surface of the recess and wherein the second drill bit guide bore exits at the second surface of the recess at an angle of about 30° relative to the adjacent face of the hexagonal nut abutting the second surface of the recess.

* * * * *

UNITED STATES PATENT AND TRADEMARK OFFICE
CERTIFICATE OF CORRECTION

PATENT NO.   : 6,508,613 B2
DATED        : January 21, 2003
INVENTOR(S)  : Larry Dean Cline et al.

It is certified that error appears in the above-identified patent and that said Letters Patent is hereby corrected as shown below:

Column 7,
Line 9, after the words "of a drill" and before the word "the", a comma -- , -- should be inserted.

Column 8,
Line 18, after the word "end" and before the word "each", the word -- of -- should be inserted.

Column 9,
Line 6, after the word "hole" and before the word "through", the word -- transversely -- should be inserted and the word "tranversely" should be deleted.
Line 31, after the word "guide" and before the word "cyclindrical", the words -- having a generally -- should be inserted and the words "for guiding" should be deleted.

Column 10,
Line 10, after the word "of" and before the word "nut", the word -- the -- should be inserted.
Line 26, after the word "hole" and before the word "through", the word -- transversely -- should be inserted and the word "transversely" should be deleted.

Signed and Sealed this

Twenty-ninth Day of June, 2004

JON W. DUDAS
*Acting Director of the United States Patent and Trademark Office*